(12) United States Patent
Ishimatsu

(10) Patent No.: US 11,838,699 B2
(45) Date of Patent: Dec. 5, 2023

(54) IMAGE PROCESSING APPARATUS, IMAGE PICKUP APPARATUS, AND IMAGE PROCESSING METHOD

(71) Applicant: CANON KABUSHIKI KAISHA, Tokyo (JP)

(72) Inventor: Rie Ishimatsu, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/363,967

(22) Filed: Jun. 30, 2021

(65) Prior Publication Data

US 2022/0006992 A1 Jan. 6, 2022

(30) Foreign Application Priority Data

Jul. 6, 2020 (JP) ................................. 2020-116306
Sep. 25, 2020 (JP) ................................. 2020-160360

(51) Int. Cl.
*G02F 1/137* (2006.01)
*G02F 1/1335* (2006.01)
*H04N 9/64* (2023.01)
*G02F 1/01* (2006.01)

(52) U.S. Cl.
CPC ........... *H04N 9/646* (2013.01); *G02F 1/0136* (2013.01); *G02F 1/137* (2013.01); *G02F 1/133528* (2013.01); *H04N 2209/04* (2013.01)

(58) Field of Classification Search
CPC .. H04N 9/646; H04N 2209/04; G02F 1/0136; G02F 1/133528; G02F 1/137
See application file for complete search history.

(56) References Cited

U.S. PATENT DOCUMENTS

| | | | | |
|---|---|---|---|---|
| 2003/0128321 | A1* | 7/2003 | Nakanishi | H04N 9/3105 348/E9.027 |
| 2018/0011239 | A1* | 1/2018 | Yamaguchi | G02B 27/28 |
| 2019/0166342 | A1* | 5/2019 | Kondo | H04N 5/2254 |
| 2022/0210322 | A1* | 6/2022 | Hirasawa | G06T 1/0007 |

FOREIGN PATENT DOCUMENTS

| | | |
|---|---|---|
| JP | 2016-145924 A | 8/2016 |
| JP | 2017-191986 A | 10/2017 |

* cited by examiner

*Primary Examiner* — Mariam Qureshi
(74) *Attorney, Agent, or Firm* — CANON U.S.A., INC. IP Division

(57) ABSTRACT

An apparatus includes an acquisition unit configured to acquire first polarization information that includes a polarized light component and an angle component using luminance values of input images obtained by imaging light of a plurality of colors in a plurality of different polarization states, a correction unit configured to acquire corrected polarization information obtained by replacing at least part of the first polarization information in a specific area with second polarization information obtained using a luminance value of a specific color among the plurality of colors in the specific area in the input images, and a generation unit configured to generate an output image using the corrected polarization information. The polarized light component is a luminance component that changes according to polarization angles. The angle component is a polarization angle that maximizes the luminance value.

11 Claims, 13 Drawing Sheets

$\alpha_c$=0 (deg)

$\alpha_c$=45 (deg)

$\alpha_c$=90 (deg)

$\alpha_c$=135 (deg)

US 11,838,699 B2

IMAGE PROCESSING APPARATUS, IMAGE PICKUP APPARATUS, AND IMAGE PROCESSING METHOD

BACKGROUND OF THE DISCLOSURE

Field of the Disclosure

The aspect of the embodiments relates to image processing technologies for a plurality of colored images including polarization information.

Description of the Related Art

It is known that a predetermined feature of an object can be emphasized and detected by observing a polarization state of light from the object. For example, changing a polarization direction of light that passes through a polarizing filter mounted in front of the lens in a single-lens reflex camera and capturing an image can provide an effect of highlighting a texture such as a color and contrast of an object and an effect of emphasizing or reducing the reflection of reflected light on a water surface or the like.

Japanese Patent Laid-Open No. ("JP") 2017-191986 discloses a method for reducing coloring in a generated output image in calculating polarization information from a plurality of input images generated by imaging with different polarization states and by generating an output image from the polarization information. More specifically, this method corrects coloring of the combined image based on the color information of the reference image selected from the plurality of input images.

The method disclosed in JP 2017-191986 has an issue in that the coloring of the output image is not corrected when the color information of the reference image is not correctly acquired.

SUMMARY OF THE DISCLOSURE

An apparatus according to one aspect of the embodiments includes at least one processor and a memory coupled to the at least one processor, the memory having instructions that, when executed by the processor, performs operations as an acquisition unit configured to acquire first polarization information that includes a polarized light component and an angle component using luminance values of input images obtained by imaging light of a plurality of colors in a plurality of different polarization states, a correction unit configured to acquire corrected polarization information obtained by replacing at least part of the first polarization information in a specific area with second polarization information obtained using a luminance value of a specific color among the plurality of colors in the specific area in the input images, and a generation unit configured to generate an output image using the corrected polarization information. The polarized light component is a luminance component that changes according to polarization angles. The angle component is a polarization angle that maximizes the luminance value.

An apparatus according to another aspect of the embodiments includes a processor and a memory coupled to the at least one processor, the memory having instructions that, when executed by the processor, performs operations as an acquisition unit configured to acquire a plurality of input images generated with a plurality of polarized light beams having different polarization states from each other via a variable retardation plate, and to acquire polarization information at a representative wavelength of each of the plurality of input images, a setting unit configured to set the representative wavelength for each of a plurality of color channels in the plurality of input images, and a generation unit configured to generate an output image from the polarization information. The setting unit acquires information on a polarization angle for each color channel in the plurality of input images from the representative wavelength, acquires information on a luminance and phase that changes according to the polarization angle for each color channel, from the information on the polarization angle and the plurality of input images, and sets the representative wavelength for each color channel according to a phase difference between the color channels.

An image pickup apparatus including the above image processing apparatus and an image processing method corresponding to the above image processing apparatus also constitute another aspect of the embodiments.

Further features of the disclosure will become apparent from the following description of exemplary embodiments with reference to the attached drawings.

DESCRIPTION OF THE EMBODIMENTS

Figure 1:
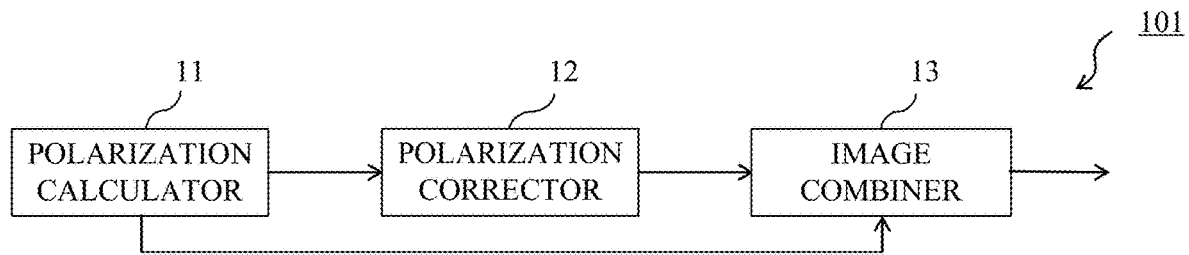
FIG. 1 is a block diagram showing a configuration of an image processing apparatus according to one embodiment of the disclosure.

Referring now to the accompanying drawings, a description will be given of embodiments according to the disclosure. FIG. 1 illustrates a configuration of an image processing apparatus 101 according to one embodiment of the disclosure. The image processing apparatus 101 includes a polarization calculator (acquisition unit) 11, a polarization corrector (correction unit) 12, and an image combiner (generation unit) 13.

The polarization calculator 11 acquires an RGB image (referred to as a captured image hereinafter) as an input image generated by imaging light of a plurality of colors (referred to as R, G, and B in the examples) in different polarized states using an image pickup apparatus described later in a third embodiment. At this time, one or more images are acquired as captured images. The polarization calculator 11 calculates first polarization information for each of R, G, and B in each pixel from luminance information of the acquired captured image.

The polarization corrector 12 calculates second polarization information using information of a specific color among R, G, and B in a specific area of the captured image, and generates corrected polarization information made by replacing the first polarization information calculated by the polarization calculator 11 with the calculated second polarization information. The polarization combiner 13 generates (combines) a combined image as an output image using at least the corrected polarization information generated by the polarization corrector 12.

A detailed description will now be given of generations of the first polarization information acquired by the polarization calculator 11 and the corrected polarization information generated by the polarization corrector 12.

When an image is acquired by imaging through an element (such as a polarizing plate) that transmits linearly polarized light having a specific polarization direction, there is a relationship represented by the following expression (1) between an angle $\alpha$ of the transmitting linearly polarized light (referred to as a polarization angle hereinafter) and a luminance value (luminance information) $I_j(\alpha)$ in each pixel in the acquired image:

$$I_j(\alpha) = A_j \cos^2(\alpha - \theta_j) + B_j \quad (1)$$

Figure 2:
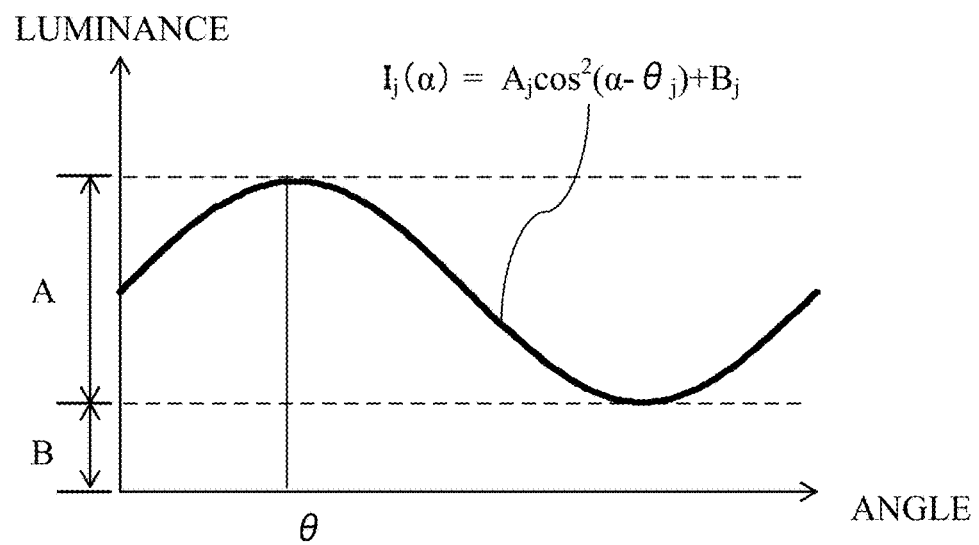
FIG. 2 illustrates a relationship between a pixel luminance and polarization information.

FIG. 2 illuminates the luminance value $I_j(\alpha)$ relative to the polarization angle $\alpha$ of a certain color channel in a certain pixel, where j represents one of the colors R, G, and B and, for example, $I_R$ represents the luminance value in a certain pixel R. $A_j$ represents a luminance component that changes according to the polarization angle $\alpha$ (referred to as a polarized light component hereinafter), and $B_j$ represents a luminance component that does not change according to the polarization angle $\alpha$ (referred to as a nonpolarized light component hereinafter). $\theta_j$ represents a polarization angle that maximizes the luminance value $I(\alpha)$. In other words, $\theta_j$ is polarization angle corresponding to maximum luminance value. $\theta_j$ is referred to as an angle component hereinafter. $A_j$, $B_j$ and $\theta j$ are constants calculated for each pixel and for each color.

Changing the polarization angle $\alpha$ to three or more different angles and acquiring an image can provide $A_j$, $B_j$, and $\theta_j$ in the expression (1). Thereby, the relationship between the polarization angle $\alpha$ and the luminance value $I_j(\alpha)$ can be acquired for each color channel and for each pixel.

The angle component $\theta_j$ usually does not change depending on the color. This is because the polarized light component $A_j$ is mainly derived from the specular reflection component. Since the specular reflection component follows the Fresnel's law, a reflectance of s-polarized light is generally higher than that of p-polarized light. Thus, the direction of the s-polarized light and the direction of the angle component $\theta_j$ coincide with each other. The direction of the s-polarized light is determined by the incident plane and the emission plane, and does not depend on the wavelength (color).

Due to some errors, the angle component $\theta_j$ may be differently calculated depending on the color. In particular, when the polarization angle $\alpha$ is controlled with a polarizing element including a variable retardation plate disclosed in JP 2017-191986, it is affected by the angular characteristic of the variable retardation plate, the wavelength dependence of the retardation, and the like, the influence of the wavelength (color) becomes remarkable.

Figure 9A:
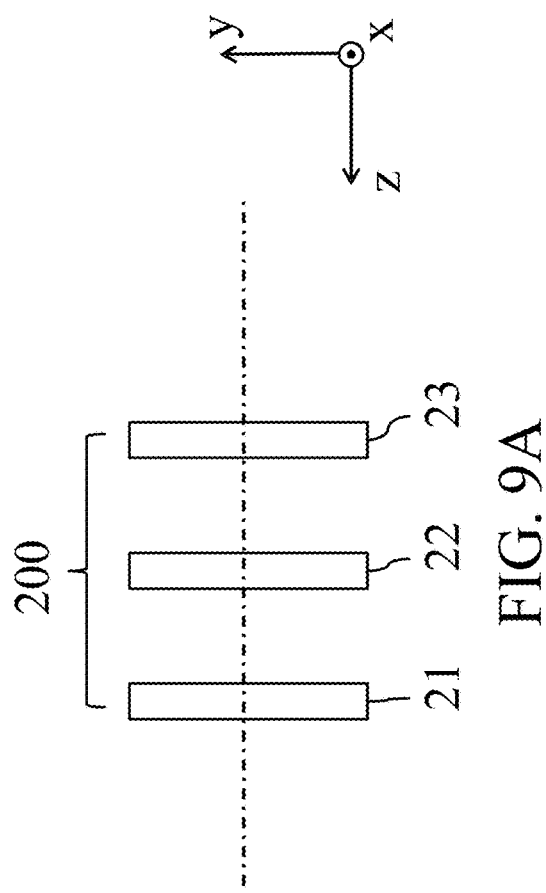
FIGS. 9A to 9D illustrate a configuration of a polarizing element according to the first embodiment.
Figure 9D:
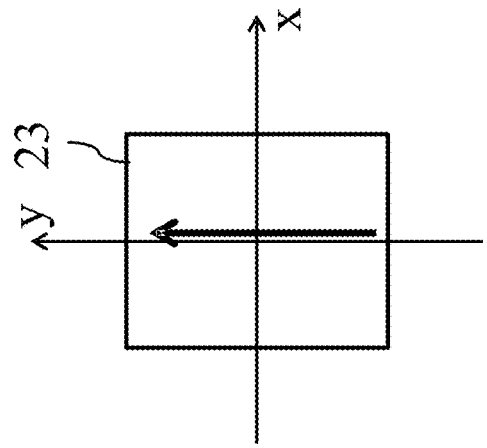
Figure 9C:
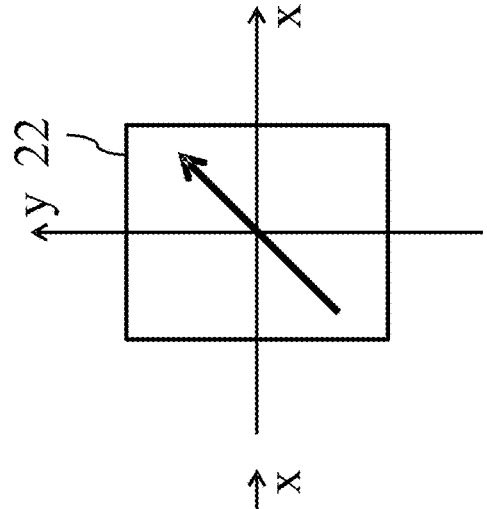
Figure 9B:
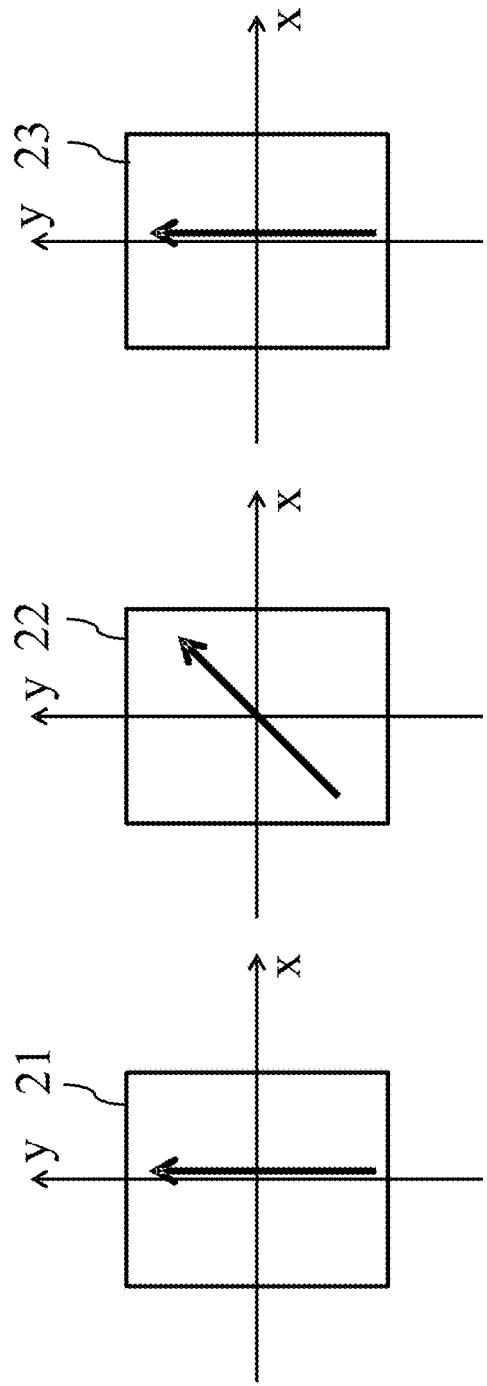

FIG. 9A illustrates a configuration of a polarizing element 200 disclosed in JP 2017-191986, and FIGS. 9B to 9D illustrate a quarter waveplate 21, a variable retardation plate 22 including a liquid crystal, and a polarizing plate 23, which are elements of the polarizing element 200, respectively. Arrows in FIGS. 9B to 9D point to any of a fast axis, a slow axis, and a transmission axis. A z-axis indicates an optical axis direction during imaging, and the x-axis and the y-axis indicate axes in a plane orthogonal to the optical axis (z-axis) and orthogonal to each other. Angles formed by the axial directions of the quarter waveplate 21, the variable retardation plate 22, and the polarizing plate 23 relative to the x-axis are 90°, 45°, and 90°, respectively.

The quarter waveplate 21 gives a relative retardation (phase difference) of $\pi/2$ (rad) between the polarized light components orthogonal to each other in the incident light. The relative retardation of $\pi/2$ given by the quarter waveplate 21 is invariant (fixed). The variable retardation plate 22 is an element using a liquid crystal, and gives a relative retardation that is variable according to the voltage applied between the orthogonal polarized light components. The polarizing plate 23 transmits a polarized light component in the transmission axis direction.

When RGB light transmits through the thus configured polarizing element 200, the peak position of the polarization angle component $\cos^2(\alpha_c - \theta_j)$ at the specific polarization angle $\alpha_c$ shifts among R, G and B, and the combined image generated with the polarization angle component $\cos^2(\alpha_c - \theta_j)$ at the specific polarization angle $\alpha_c$ has unnatural coloring (unnecessary color) that would not occur in a normal image. Since this coloring is caused by the shift of the polarization angle component $\cos^2(\alpha_c - \theta_j)$ peak position among R, G, and B, coloring changes depending on the value of the specific polarization angle $\alpha_c$ used to generate the combined image.

In the embodiment, in order to reduce the coloring that varies depending on the value of the specific polarization angle $\alpha_c$, the polarization corrector 12 generates (information of) the corrected angle component as the corrected polarization information, and the polarization combiner 13 generates the combined image using the corrected angle component.

The corrected angle component is generated by replacing an angle component (first polarization information) for each color channel calculated for each pixel by the polarization calculator 11 in a specific area in the captured image, with a separately calculated angle component (second polarization information). The separately calculated angle component is an angle component calculated using information of a specific color among R, G, and B. For example, when G is selected as a specific color, information on $\theta_G$ of all pixels is calculated using the luminance value of G and the expression (1) in the specific area, and $\theta_R$, $\theta_G$, and $\theta_B$ calculated by the polarization calculator 11 are replaced with $\theta_G$. This processing makes $\theta_R$, $\theta_B$ and $\theta_G$ equal to each other, and can reduce coloring that varies depending on the value of $\alpha_c$ described above.

When the polarization calculator 11 has calculate $\theta_R$, $\theta_G$, and $\theta_B$ in advance using the respective luminance values of R, G, and B, the processing of replacing $\theta_R$ and $\theta_B$ for each pixel with $\theta_G$ in the specific area. On the other hand, when the luminance distribution of R and G is also taken into consideration in calculating $\theta_G$, the polarization corrector 12 recalculates $\theta_G"$ based on the luminance value of G, and replaces $\theta_R$, $\theta_G$, and $\theta_B$ with $\theta_G"$.

The specific color used to calculate the corrected angle component can be arbitrarily selected from R, G, and B. For example, when a captured image acquired with a Bayer array image sensor is used, G having a larger number of pixels than that of another color can be selected as the specific color.

A specific color may be selected according to the polarization information and the color information of the object image in the specific area. For example, the accuracy of the polarization information tends to be higher, as the degree of polarization (DOP) defined by the following expression (2) becomes higher:

$$DOP_j = (I_{jmax} - I_{jmin})/(I_{jmax} + I_{jmin}) = A_j/(A_j + 2B_j) \quad (2)$$

$I_{jmax}$ and $I_{jmin}$ in the expression (2) are a maximum value and a minimum value of the luminance value $I_j(\alpha)$ when the polarization angle $\alpha$ is changed in any of the color channels of R, G, and B, respectively.

A high corrected angle component can be obtained by calculating the DOP within the specific area based on the polarization information calculated by the expression (2) and the polarization calculator 11 and by selecting the color with the highest DOP among R, G, and B as the specific color.

Another method compares the luminance values of R, G, and B of the object (the area in which the object is reflected) in the specific area, and selects the color having the lowest luminance value (such as B for a yellow object) as the specified color. Since the DOP increases as the diffusion component becomes lower, the luminance value for each of R, G, and B of the object in the captured image tends to be inversely proportional to the DOP for each of R, G and B. Thus, even this method can indirectly select a color having a high DOP as the specific color.

The method of selecting any one of R, G, and B as the specific color has been described, but two colors (such as B and G, R and B, etc.) may be selected. Even in that case, as described above, two colors may be selected based on the DOP, the color of the object, the number of pixels, and the like. The above description generates the corrected angle component using the angle component of the specific color by replacing $\theta_B$, $\theta_G$, and $\theta_R$, but the corrected angle component may be generated by replacing $\alpha_c - \theta_j$ and $\cos^2(\alpha_c - \theta_j)$.

This replacement processing of the angle component in the specific area can reduce a calculation amount in comparison with the processing of the entire image. Thus, the specific area may be selected from an area that requires the replacement processing of the angle component, that is, an area in which coloring is likely to occur. For example, an area may be selected in which the DOP is larger than a predetermined value (threshold) or an area in which a difference in the angle component $\theta$ for each of R, G, and B is larger than the threshold.

The specific area is not limited to one, and a plurality of specific areas may be selected from the entire image. In selecting multiple specific areas, an arbitrary classification method or an arbitrary method may be selected or separated, such as specifying a specific area for each specific color used to calculate the corrected angle component, separating a specific area for each object, and separating a specific area for the background and the main object. The entire image may be divided into a plurality of areas in advance according to the object, color, DOP, etc., and the specific area may be selected from the plurality of divided areas.

First Embodiment

Figure 3:
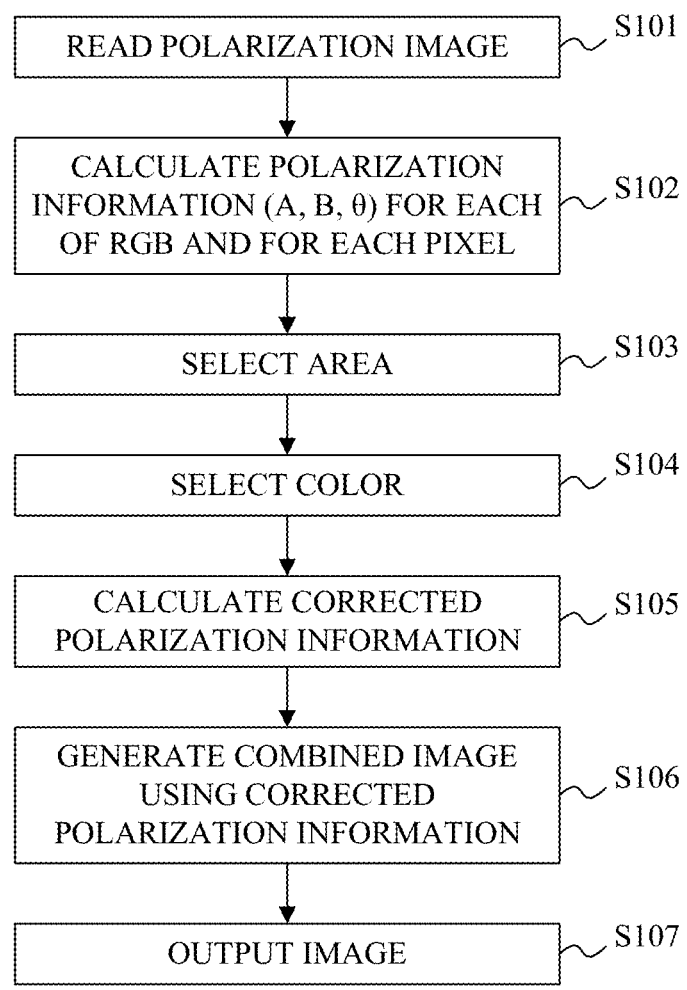
FIG. 3 is a flowchart showing image processing according to first and second embodiments.

A flowchart in FIG. 3 shows processing (image processing method) according to a first embodiment executed by the image processing apparatus 101 illustrated in FIG. 1. The image processing apparatus 101 is configured by a computer and executes this processing according to a computer program.

In the step S101, the image processing apparatus 101 reads polarized image data as a captured image generated by imaging each of R, G, and B in different polarization states. The polarized image data to be read is a colored image having luminance information for each of R, G, and B, and is a RAW image that has received no compression processing or gamma processing. In the embodiment, an image is captured with the polarizing element 200 shown in FIGS. 9A to 9D by an image pickup apparatus provided with an imaging sensor in a Bayer array. The polarizing element 200 can modulate the polarization angle $\alpha$, which is the polarization direction of the transmitting light, by changing the in-plane retardation (phase difference) $\Delta$ imparted by the variable retardation plate 21 to the transmitting light. A relationship between the polarization angle $\alpha$ (deg) of the transmitting light and the in-plane retardation $\Delta$ (nm) is expressed by the following expression (3):

$$\alpha = \Theta - 180 \cdot \Delta/\lambda \quad (3)$$

In the expression (3), $\Theta$ is a transmission axis angle (deg) of the polarizing plate 23 disposed in the polarizing element 200, and $\lambda$ is a wavelength (nm) of the transmitting light. From the expression (3), the captured image obtained by imaging through the polarizing element 200 using the variable retardation plate 21 has a different polarization angle $\alpha$ depending on the wavelength $\lambda$.

Figures 4A, 4B, 4C:
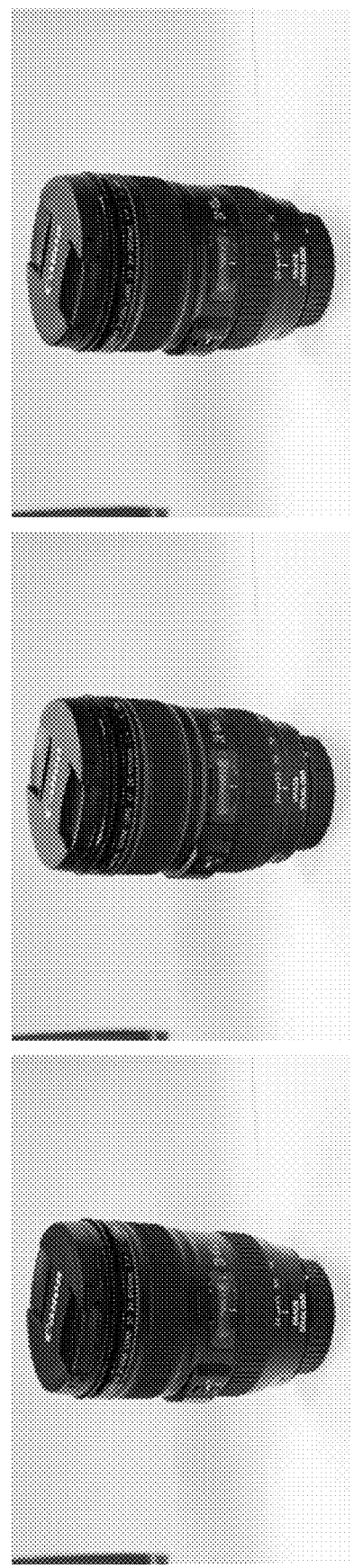
FIGS. 4A to 4C illustrate a captured image according to the first embodiment.

FIGS. 4A to 4C illustrate an example of three captured images (polarized image data) acquired in this embodiment. The captured images in FIGS. 4A to 4C are obtained by imaging the polarizing plate 23 at the transmission axis angle $\Theta$ of 90° and in-plane retardations $\Delta$ of 10 nm, 133 nm, and 265 nm, respectively. Table 1 shows the polarization angles $\alpha$ (deg) of the R, G, and B color channels at this time.

TABLE 1

| | $\Delta$ (nm) | | |
| --- | --- | --- | --- |
| | 10.0 | 133.0 | 265 |
| B | 86.2 | 39.3 | −11.5 |
| G | 86.6 | 45.0 | 0.0 |
| R | 87.0 | 50.3 | 10.5 |

$\alpha$ (deg)

Table 1 sets the wavelengths used to calculate the transmission angles of the R, G, and B color channels to 600 nm, 530 nm, and 470 nm, respectively, and selects the wavelength that maximizes the transmission light amount of the color filters disposed in the pixels of R, G, and B.

Next, in the step S102, the image processing apparatus 101 (polarization calculator 11) plots the luminance value of each pixel relative to the polarization angle α from the luminance value data of the three captured images shown in FIGS. 4A to 4C, and calculates the polarization information $A_j$, $B_j$, and $θ_j$ of each pixel. More specifically, since any of R, G, and B luminance values is acquired for each pixel of the captured image, the value of the transmission angle α in Table 1 is selected according to R, G, or B of the pixel, and the polarization information $A_j$, $B_j$, $θ_j$ of any of R, G, and B is calculated according to the pixel. Then, demosaic processing to the captured image finds the polarization information $A_j$, $B_j$, and $θ_j$ for R, G, and B of all the pixels. A general method may be used for the demosaic processing. In consideration of the subsequent processing, this embodiment performs the demosaic processing using the luminance value of each color for each color channel.

This embodiment acquires the polarization information, and then the polarization information of R, G, and B of all the pixels using the demosaic processing, but may perform the demosaic processing for the luminance value of the captured image, and then calculate the polarization information for each pixel and each color. Nevertheless, a method of calculating the polarization information and then performing the demosaic processing is advantageous due to a smaller calculation amount.

Object alignment processing may be performed as necessary before the polarization information is calculated from the three captured images.

After the polarization information $A_j$, $B_j$, and $θ_j$ for R, G, and B of all the pixels is calculated in this way, in the step S103, the image processing apparatus 101 (polarization corrector 12) selects a specific area from the entire area of the captured image. As described above, the difference of $θ_j$ caused by the DOP or RGB is compared with the threshold, and an area in which the DOP is larger than the threshold or an area in which the difference of $θ_j$ is larger than the threshold is selected as the specific area. In this embodiment, an area having the DOP larger than the threshold is selected as the specific area. In addition, in this embodiment, the threshold is determined with a histogram of the DOP.

Figure 5B:
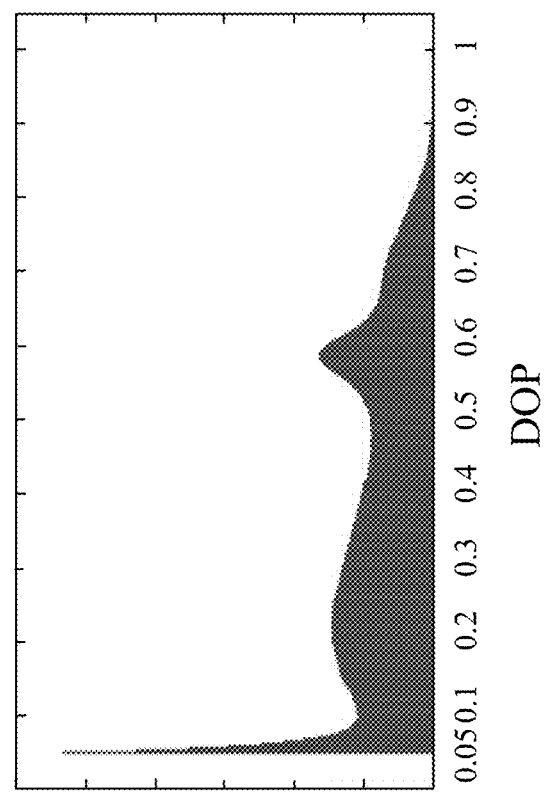
FIGS. 5A and 5B illustrate degree of polarization histograms according to the first embodiment.
Figure 5A:
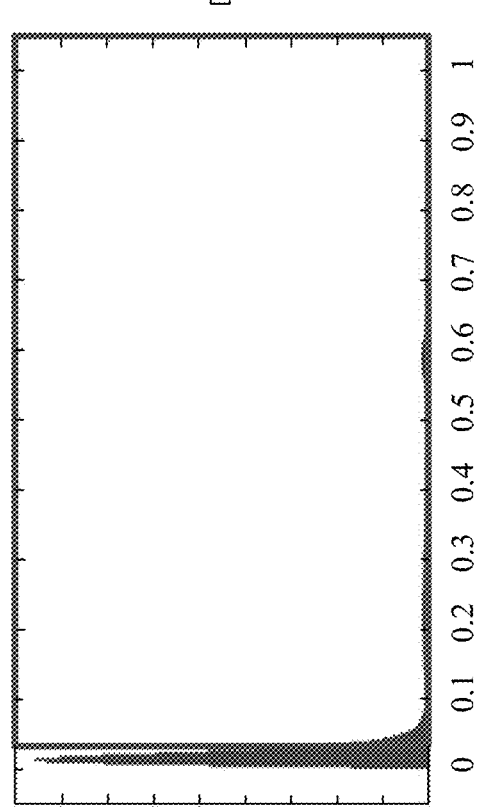

FIGS. 5A and 5B illustrate histograms of the degree of polarization (DOP) used to determine the threshold. FIG. 5A illustrates a histogram with a DOP of 0 to 1, and FIG. 5B illustrates a histogram with a DOP of 0.05 to 1. From FIGS. 5A and 5B, it can be estimated that an area having a DOP less than 0.1 is a background image, and an area having a DOP around 0.6 is an area having a DOP peak in the object. This embodiment determines the DOP of 0.45, which is around 0.6, as a threshold and selects an area having a DOP of 0.45 or higher as the specific area so as to exclude the background area and to sufficiently correct the colored area of the object.

Figure 6:
FIG. 6 illustrates a threshold area according to the first embodiment.
Figure 7A:
FIGS. 7A to 7D illustrate combined images according to the first embodiment.
Figure 7B:
Figure 7C:
Figure 7D:

FIG. 6 illustrates a specific area selected by the above method in the captured image. In FIG. 6, an area having a DOP of 0.45 or higher is expressed by white, and an area having a DOP of less than 0.45 is expressed by black. From the comparison between FIGS. 6 and 4A to 4C, it is understood that selecting the area having a DOP of 0.45 or higher as the specific area can select the area in which the luminance value varies depending on the polarization state.

Setting the threshold for the DOP is not limited to the method using the histogram of the DOP described above, and an arbitrary threshold may be used. For example, although it depends on the captured image, it may be usually set to 0.1 or higher, or 0.3 or higher. The specific area in which the difference of $θ_j$ is larger than the threshold can be selected in the same manner as that when the DOP is used.

Next, in the step S104, the image processing apparatus 101 (polarization corrector 12) selects a specific color used to generate the corrected polarization information. Assuming that the object is almost achromatic, this embodiment selects G that is assigned to many pixels as a specific color.

In selecting the specific color using the hue of the captured image, the hue of the captured image may be determined with the image that minimizes the absolute value of the retardation of the variable retardation plate among the captured images (the captured image shown in FIG. 4A in this embodiment). This is because the wavelength dispersion of the polarization angle α increases as the absolute value of the retardation of the variable retardation plate increases, and consequently the captured image comes to include coloring due to the wavelength dispersion of the polarization angle $α_j$.

In the step S105, the polarization corrector 12 that has selected the specific color generates (calculates) the corrected polarization information using the information of G, which is the specific color. In calculating the polarization information in the step S102, this embodiment calculates the polarization information of R, G, and B of each pixel using the luminance values of R, G, and B, respectively. Therefore, this embodiment generates the corrected polarization information by replacing $θ_R$ and $θ_B$ of each pixel in the specific area with $θ_G$.

Next, in the step S106, the image processing apparatus 101 (image combiner 13) generates a combined image using the corrected polarization information and the polarization information. This embodiment calculates the luminance value $I_j'$ of each pixel in the combined image using the following expression (4).

$$I_j'(α_c)=k_1A_j\cos^2[k_2(α_c-θ_j')]+k_3B_j \quad (4)$$

In the expression (4), $k_1$ to $k_3$ are arbitrary coefficients, and $α_c$ is an arbitrary polarization angle. $θ_j'$ is the corrected polarization information (corrected angle component) generated in the step S105, and $A_j$ and $B_j$ are the polarized light component and the nonpolarized light component calculated in the step S102, respectively.

The coefficients $k_1$ to $k_3$ and the polarization angle $α_c$, use constant values regardless of R, G, and B and pixels. Setting these coefficients and the polarization angle to constant values regardless of the color or pixel can unify the texture in the image given to the combined image by the polarization information. These coefficients do not necessarily have to be equal in the entire image, and may be set for each area in the image, for each object, or for each area where the texture is desired to be unified.

This embodiment sets $k_1=k_2=k_3=1$ over the entire image, and generates four combined images at $α_c=0°$, 45°, 90°, and 135°. FIGS. 7A to 7D show an example of combined images generated under this condition. The combined images actually generated are colored images, but are shown as monochromatic images in FIGS. 7A to 7D. From these figures, it is understood that generating the combined images by changing the polarization angle $α_c$ can produce a combined image having a different gloss position.

Finally, in the step S107, the image processing apparatus 101 outputs the generated combined image and ends this processing.

This embodiment sets the in-plane retardation Δ to a constant value for R, G, and B, but Δ may be different for R, G, and B. If Δ is different for R, G, and B, the polarization angle α may be calculated using an appropriate Δ for each color channel.

Comparative Example

The effect of using the corrected angle component in the first embodiment will be compared with a comparative example that does not use the corrected angle component. This comparative example uses the angle component $\theta_j$ instead of the corrected angle component $\theta_j'$ in generating the combined image, and generates four combined images ($\alpha_c$=0°, 45°, 90°, 135°) similar to the first embodiment using the same method as that of the first embodiment other than the above.

Figure 8:
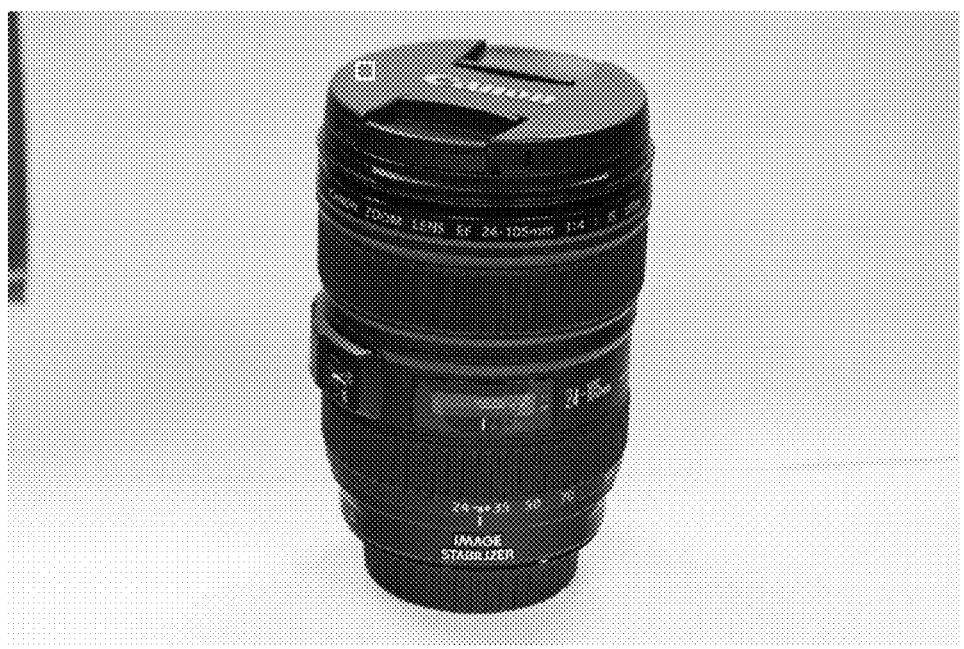
FIG. 8 illustrates extracted areas in the first embodiment and a comparative example.

Table 2 shows a calculation result of L*a*b* representative values in each combined image so as to confirm coloring depending on the polarization angle $\alpha_c$ in the four combined images generated in the comparative example and the four combined images generated in the first embodiment (simply referred to as embodiment in the table). The L*a*b* representative values in each combined image are made by extracting the same partial area (the area in the white frame on the lens cap of the interchangeable lens shown in FIG. 8) in the four combined images, and by calculating the average value of L*a*b* in the same partial area. Table 2 also shows the average and dispersion of the L*a*b* representative values in each combined image.

TABLE 2

| $\alpha_c$ | EMBODIMENT | | | COMPARATIVE EXAMPLE | | |
|---|---|---|---|---|---|---|
| | L* | a* | b* | L* | a* | b* |
| 0 | 60.6 | 1.395 | −3.207 | 60.5 | 1.071 | −3.694 |
| 45 | 48.4 | 1.275 | −3.457 | 48.7 | 3.337 | −1.544 |
| 90 | 22.4 | −0.120 | −3.212 | 22.4 | 1.161 | −2.802 |
| 135 | 43.5 | 0.874 | −2.890 | 43.3 | −2.163 | −5.475 |
| AVERAGE | 43.7 | 0.856 | −3.191 | 43.7 | 0.852 | −3.379 |
| DISPERSION | 189.8 | 0.355 | 0.040 | 189.4 | 3.852 | 2.048 |

In the representative values of L*a*b* in the first embodiment and the comparative example in Table 2, the value of L* representing the lightness is almost the same in the first embodiment and the comparative example, whereas the values of a* and b* representing the chromaticity differ between the first embodiment and the comparative example, and the variation in the comparative example is larger than that in the first embodiment. When the dispersions of a* and b* are compared, the dispersion of the comparative example is larger than that of the first embodiment. From this fact, it can be seen that a change in tint between the combined images is smaller in the first embodiment than in the comparative example, and using the corrected angle component can reduce coloring that varies depending on the value of $\alpha_c$.

Second Embodiment

A second embodiment according to the disclosure will be described. The second embodiment is different from the first embodiment in that the second embodiment calculates, as the corrected polarization information, (information of) a corrected polarized light component $A_j'$ and a corrected nonpolarized light component $B_j'$ as well as the corrected angle component $\theta_j'$, and generates a combined image using $\theta_j'$, $A_j'$, and $B_j'$.

The second embodiment executes the steps S101 to S104 in the image processing shown in FIG. 3, similar to the first embodiment. The calculation of the corrected angle component $\theta_j'$ in the step S105 is the same as that in the first embodiment.

In the second embodiment, in the step S105, the image processing apparatus 101 (polarization corrector 12) further calculates the corrected polarized light component $A_j'$ and the corrected nonpolarized light component $B_j'$ using the corrected angle component $\theta_j'$. The corrected polarized light component $A_j'$ and the corrected nonpolarized light component $B_j'$ are generated by replacing a polarized light component and a nonpolarized light component for each color calculated for each pixel by the polarization calculator 11 in the specific area in the captured image, with a polarized light component and a nonpolarized light component calculated separately. The separately calculated polarized light component and nonpolarized light component are calculated from the expression (1) using the corrected angle component $\theta_j'$ and the luminance value data of the three captured images.

More specifically, the corrected angle component $\theta_j'$ in which $\theta_R$ and $\theta_B$ of each pixel in the specific area are replaced with $\theta_G$ is set to $\theta_j$ in the expression (1), and the polarized light component $A_j$ and the nonpolarized light component $B_j$ for each pixel are again obtained from the luminance value data of the three captured images. Then, the corrected polarized light component $A_j'$ and the corrected nonpolarized light component $B_j'$ are made by replacing polarized light components $A_R$ and $A_G$ and nonpolarized light components $B_R$ and $B_G$ calculated by the polarization calculator 11 with the polarized light component $A_j$ and the nonpolarized light component $B_j$. This processing can correct the error contained in the polarized light component and the nonpolarized light component.

In the step S1076, the image processing apparatus 101 (image combiner 13) generates a combined image using $\theta_j'$, $A_j'$, and $B_j'$.

While the first embodiment generates a combined image using the corrected angle component and the polarization information (polarized light component and nonpolarized light component) calculated in the step S102, the second embodiment generates a combined image using the corrected polarization information (corrected polarized light component, corrected nonpolarized light component, and corrected angle component). This configuration can reduce coloring caused by the error between the polarized light component and the nonpolarized light component.

In the first and second embodiments, the polarization calculator 11 performs the demosaic processing and calculates the polarization information of all pixels and all color channels, but the timing of the demosaic processing can be changed as appropriate. For example, after the luminance value of each pixel is calculated using the expression (4) in generating the combined image, the demosaic processing may be performed. At that time, generate the polarization information of each pixel in the specific area from the information of peripheral pixels in calculating the corrected polarization information is generated.

The polarizing element used for imaging for a captured image is not limited to the polarizing element 200 shown in FIGS. 9A to 9D. For example, various polarizing elements can be used, such as a polarizing plate, a C-PL filter that combines a polarizing plate and a quarter waveplate, and a polarizing sensor in which a polarizing element in a different direction is incorporated in each pixel on an imaging sensor.

Generating the combined image is not limited to the method using the expression (4) and, for example, a combined image may be generated by calculating the luminance value $I_j'$ of each pixel using a plurality of polarization angles $\alpha_{c1}$ to $\alpha_{cn}$ as shown in the following expression (5):

$$I_j' = \Sigma k_{1n} A_j \cos^2[k_{2n}(\alpha_{cn} - \theta_j)] + k_3 B_j \quad (5)$$

In the expression (5), $k_{1n}$, $k_{2n}$, and $k_3$ are arbitrary coefficients, and $\alpha_{cn}$ is an arbitrary polarization angle. The coefficients and polarization angle use constant values regardless of R, G, and B and the pixel, similar to the expression (3). The combined image may be generated with part of the expression (4) or (5).

General image processing such as noise reduction processing, contrast correction processing, and white balance correction processing may be performed for the captured image, the combined image, the polarization information, and the corrected polarization information.

The captured image does not necessarily have to be a raw image, and a compressed image such as a JPEG image can also be used. When a captured image in which the luminance value is gamma-corrected is used, a reverse correction may be performed before the polarization information is calculated to return the luminance value to a linear shape.

Third Embodiment

Figure 10:
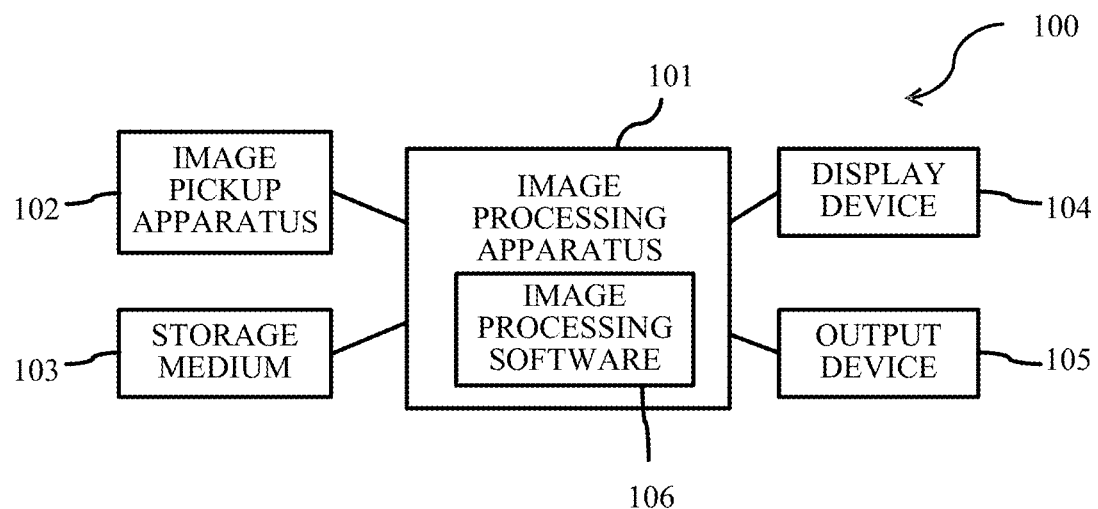
FIG. 10 illustrates a configuration of an image processing system according to a third embodiment of the disclosure.

FIG. 10 illustrates the configuration of the image processing system 100 including the image processing apparatus 101 described above.

The image processing apparatus 101 is a computer device equipped with image processing software (an image processing program as a computer program) 106 and executes the image processing described in the first or second embodiment in accordance with the image processing software 106.

Figure 11:
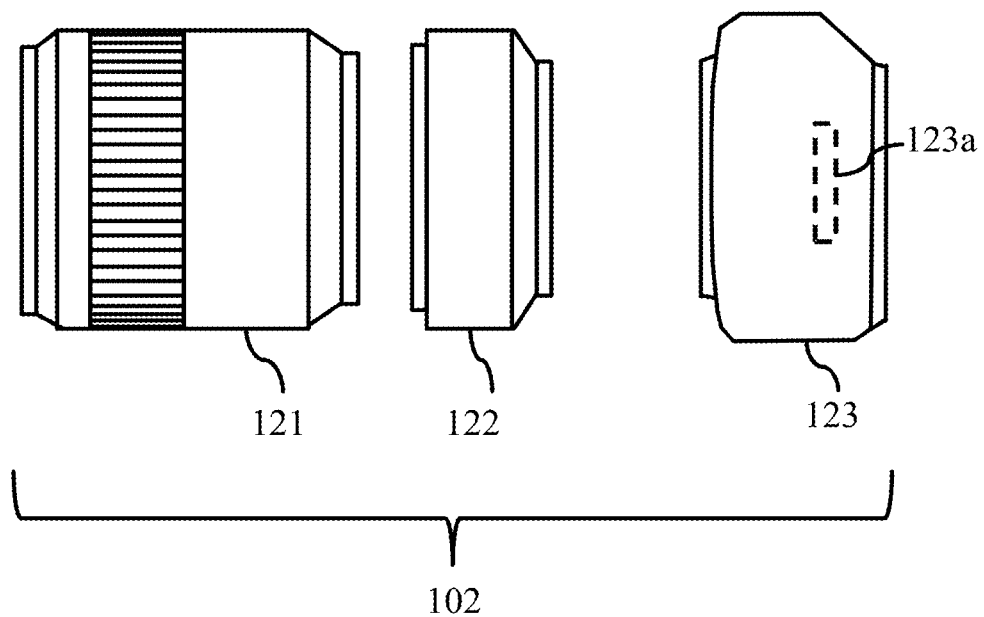
FIG. 11 illustrates a configuration of an image pickup apparatus according to the third embodiment.

The image pickup apparatus 102 is a device such as a camera, a telescope, an endoscope, and a scanner, which acquires an image through imaging. FIG. 11 illustrates a lens interchangeable type camera as an illustrative image pickup apparatus 102. The interchangeable lens camera includes an interchangeable lens 121, an adapter 122, and a digital camera body 123. The adapter 122 is provided inside the polarizing element 200 illustrated in FIG. 9A.

The digital camera body 123 includes an image sensor (image pickup element) 123a such as a CMOS sensor, and can image light that has transmitted through the interchangeable lens 121 and the adapter 122.

The polarizing element (adapter 122) is provided between the interchangeable lens 121 and the digital camera body 123 in FIG. 11, but may be provided on the object side of the interchangeable lens 121. The adapter 122 may not be provided, and a polarizing element may be provided integrally with or just before the image sensor in the digital camera body 123.

A storage medium 103 shown in FIG. 10, such as a semiconductor memory, a hard disk drive, and a server on a network, stores images acquired by imaging.

The image processing apparatus 101 acquires a captured image as an input image from the image pickup apparatus 102 or the storage medium 103 by a wired or wireless communication with it or by reading through an attachment. Then, an output image is generated by the image processing described in the first or second embodiment, and output to at least one of the output device 105, the image pickup apparatus 102, and the storage medium 103. The output image can be stored in the internal memory built in the image processing apparatus 101. The output device 105 includes, for example, a printer.

A display device 104 is also connected with the image processing apparatus 101. Thus, the user can perform image processing work and evaluate the generated output image through the display device 104. In addition to the image processing described in the first or second embodiment, the image processing apparatus 101 may perform other image processing such as development processing and image restoration processing, if necessary.

In this embodiment, the image processing apparatus 101 is separate from the image pickup apparatus 102, but it may be built in the image pickup apparatus 102.

Fourth Embodiment

Figure 12:
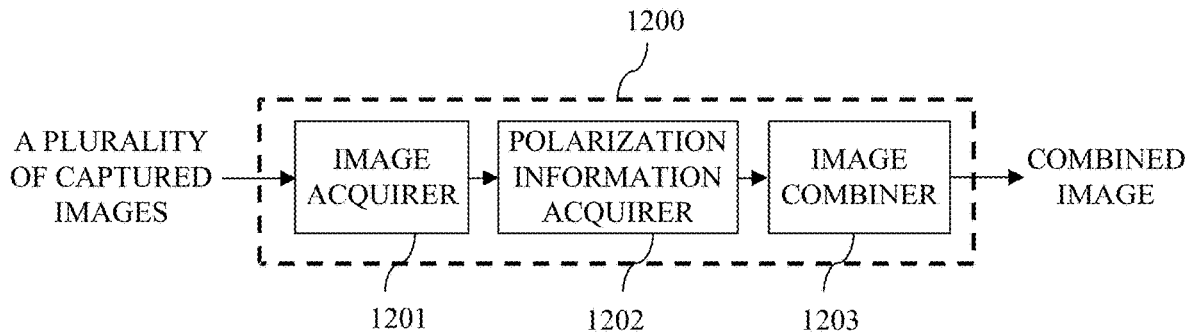
FIG. 12 is a block diagram showing a configuration of an image processing apparatus according to fourth to sixth embodiments.

FIG. 12 illustrates a configuration of an image processing apparatus 1200 according to fourth to sixth embodiments of the disclosure. The image processing apparatus 1200 receives a plurality of colored images captured with different polarized states as input images. It acquires polarization information from these input images, and generates a colored image (referred to as a combined image hereinafter) as an output image different from the input image based on the acquired polarization information. The image processing apparatus 1200 includes (a processor or circuits that serves as) an image acquirer 1201, a polarization information acquirer 1202, and an image combiner 1203.

The image acquirer 1201 acquires a plurality of input images with polarization states different from each other, which have been generated through imaging by an image pickup apparatus that includes at least a polarizing element having a variable retardation plate and a polarizing plate, and an image sensor configured to acquire a colored image. The polarization information acquirer (acquisition unit and setting unit) 102 sets a representative wavelength for each color channel of the input image, and acquires the polarization information using the representative wavelength and the plurality of input images. The image combiner (generating unit) 103 generates an output image using the acquired polarization information.

Next follows a description of acquiring the polarization information by the polarization information acquirer 1202. When an image is captured through an element (such as a polarizing plate) that transmits specific linearly polarized light, an angle φ of the transmitting linearly polarized light (hereinafter referred to as the polarization angle) and an luminance I (φ) in each pixel of the captured image has the following relationship:

$$I(\varphi) = A \cos^2(\varphi - \theta) + B \quad (6)$$

When images are captured while the polarization state is modulated and the polarization angle φ is changed to three or more different states, the polarization information A, B, and θ in the expression (6) can be found for each pixel and the luminance I(φ) against the polarization angle φ can be found. The polarization information may be calculated by fitting luminance values of four or more captured images using the expression (6). At that time, for example, the least squares method or the like can be used.

Figure 16:
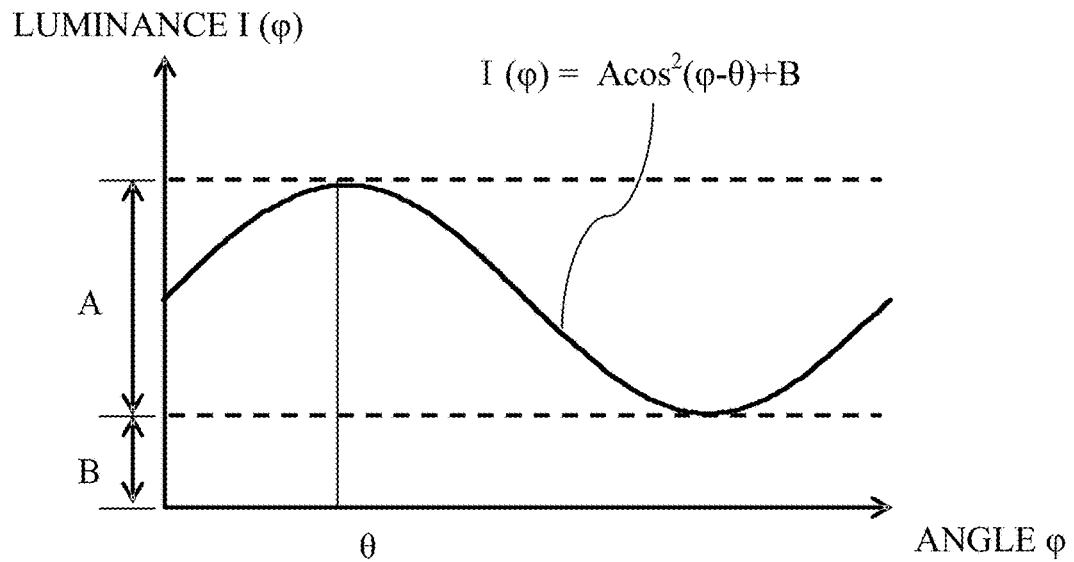
FIG. 16 illustrates luminance I and polarization information A, B, and θ against a polarization angle.

FIG. 16 illustrates the luminance I(φ) against the polarization angle φ and the polarization information A, B, and θ. Here, A is a luminance component that depends on the polarization angle φ, B is a luminance component that does not depend on the polarization angle φ, and θ is a phase that maximizes the luminance I(φ) (referred to as a phase component hereinafter).

When the means for modulating the polarization state uses a polarizing element including a waveplate, a variable retardation plate, and a polarizing plate as disclosed in the first embodiment in JP 2016-145924, the polarization angle $\varphi$ and the wavelength $\lambda$ (nm) of the incident light has the following relationship:

$$\varphi(\lambda)=\varphi p-\pi\delta/\lambda \quad (7)$$

Here, $\delta$ is a phase difference (retardation) amount (nm) given by the variable retardation plate, and $\varphi p$ (rad) is a transmission polarization angle of the polarizing plate in the polarizing element. As shown by the expression (7), the polarization angle $\varphi$ (rad) varies depending on the wavelength $\lambda$.

Light having a certain wavelength width for each color channel usually enters each pixel in the image sensor, and the luminance signal I is acquired through the photoelectric conversion. Here, the acquired luminance signal I is the total luminance of light having a certain wavelength width, and cannot be separated for each different wavelength. Hence, in order to define the polarization angle for each color channel and to acquire the polarization information for the plurality of input images, the representative wavelength $\lambda$ is set for each color channel, and the polarization information A, B, and $\theta$ is calculated for each color channel by using the polarization angle $\varphi(\lambda)$ calculated from the representative wavelength.

If the representative wavelength $\lambda$ for each color channel is not properly set, the calculated polarization information A, B, and $\theta$ includes large calculation errors and consequently the combined image created with the polarization information contains unnatural coloring. JP 2017-191986 discloses a method of setting the representative wavelength which is a method of setting a transmittance peak wavelength to the representative wavelength from the transmission wavelength distribution of a color filter used for an image sensor. However, when the intensity wavelength distribution of the illumination light and the transmission wavelength distribution of the color filter are significantly different, coloring cannot be fully reduced and unusually appears in the combined image. In particular, the influence of coloring becomes remarkable under illumination in which the spectrum of the illumination light has a steep peak against the wavelength, such as the LED illumination or fluorescent lamp illumination.

Accordingly, this embodiment pays attention to a difference in $\theta$ between color channels in each pixel and sets the representative wavelength of each color channel so as to reduce the difference. This method can reduce coloring in the combined image. A description will now be given of a method for setting the representative wavelength.

Of the polarization information A, B, and $\theta$, the phase component $\theta$ is information that does not depend on the color channel. This is because the reflected light on the surface of the object follows the Fresnel's law, so that the reflectance of the s-polarized light is larger than that of the p-polarized light except for some conditions and the phase component $\theta$ coincides with the direction of the s-polarized light. Thus, the phase component $\theta$ is determined by the surface normal of the object and does not depend on the wavelength (or the color channel). However, if the representative wavelength of each color channel is improperly selected and the calculation error included in the polarization information becomes large, the difference in the phase component $\theta$ between the color channels becomes large. That is, there is a positive correlation between the difference of the phase component $\theta$ and the calculation error included in the polarization information. Selecting the representative wavelength of each color channel so that the difference in $\theta$ for each color channel becomes as small as possible can reduce the error of the polarization information and suppress coloring in the combined image.

The polarization information acquirer 1202 serves to evaluate the difference in the phase component $\theta$ between the color channels when the polarization information is calculated by changing the representative wavelength, and finally sets the representative wavelength $\lambda$ of each color channel that makes the difference in the phase component $\theta$ equal to or less than the threshold or minimizes it. Thereby, the representative wavelength of each color channel can be optimized.

In evaluating the difference in the phase component $\theta$ for each color channel, the total value of the differences in all the pixels may be evaluated, but paying attention to pixels having a high DOP and reducing the difference in the pixels can further improve the coloring reducing effect in the combined image. Therefore, the difference in the phase component $\theta$ for each color channel may be evaluated based on the total value of the differences in the pixels having a DOP equal to or larger than a predetermined value among all the pixels or the total value of the differences weighted according to the DOP of each pixel.

In evaluating the difference in the phase component $\theta$, one method may evaluate the difference in the phase component $\theta$ between one color channel as a reference and at least another color channel. The method of selecting the reference color channel is not particularly limited but, for example, one of the plurality of color channels, which has the largest number of pixels in the image sensor used for imaging may be selected as the reference. Alternatively, a color channel with the highest DOP may be selected as a reference or a color channel may be selected as a reference which minimizes the difference between the maximum and minimum wavelengths of the light incident on each color channel and the minimum and maximum values of $\varphi(\lambda)$ calculated from the expression (7).

The representative wavelength of each color channel may be set to a different value for each pixel or may be set to the same value in the entire image or a specific area of the image. This method can reduce the noise effect in the captured image.

There is no particular limitation on the method of selecting a specific area, and a general image area dividing method can be used. Since the representative wavelength depends on the refractive index of the object, the wavelength distribution of the illumination light, and the like, it may be divided into areas where they are estimated to be equal to or close to each other. More specifically, the image may be divided into areas according to the type and color of the object, or when a plurality of types of illumination are used, the image may be divided for each area of the illumination light.

The optimized representative wavelength can be used for the white balance correction for the combined image. Conventionally, the white balance correction includes auto white balance control that automatically detects an area estimated to be white from an image generated by imaging and obtains a correction coefficient for the area. This control divides the image into a plurality of blocks, and calculates the color evaluation value for each block. A block with a calculated color evaluation value included in the preset white detecting range is determined to be white, and the correction value is calculated.

This aspect of the embodiments serves to adjust the white detecting range according to the optimized representative wavelength. This function can reduce erroneous determinations, such as detecting an area that is not originally white or failing to detect a white area, and can improve the accuracy of the white balance correction.

Figure 13:
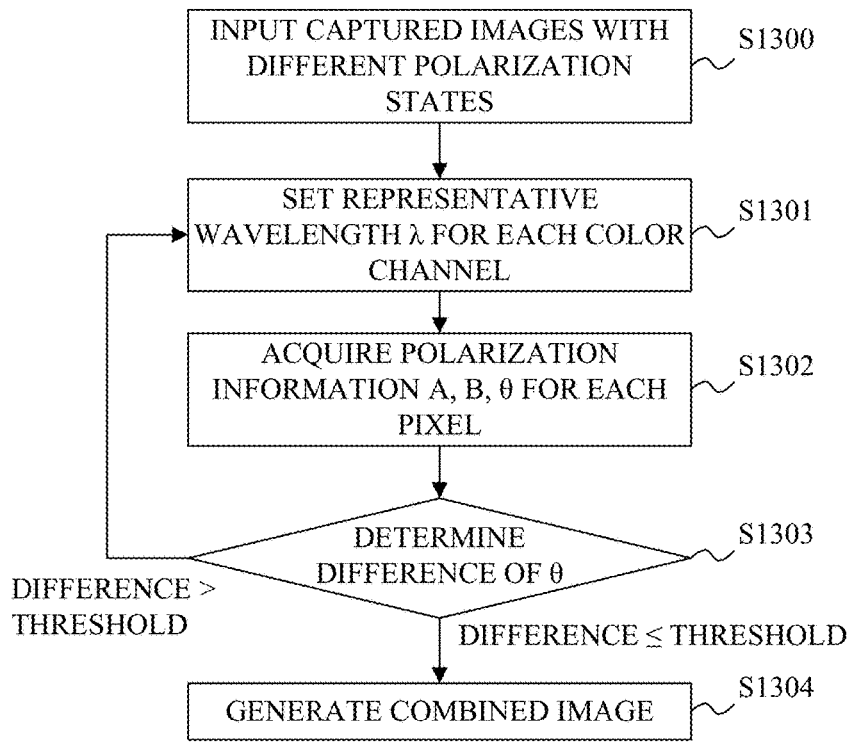
FIG. 13 is a flowchart showing image processing according to the fourth embodiment.

A flowchart in FIG. 13 shows image processing (method) executed by an image processing apparatus 1200 (including a processor or circuit that serves as the image acquirer 1201, the polarization information acquirer 1202, and the image combiner 1203) configured by a computer in the fourth embodiment of the disclosure in accordance with a computer program. In FIG. 13, "S" stands for the step.

In S1300, as described above, the image processing apparatus 1200 acquires a plurality of input images generated by an image pickup apparatus configured to capture a plurality of polarized light beams having different polarization states from each other and provided with at least a polarizing element having a variable retardation plate and a polarizing plate, and an image sensor configured to acquire a colored image.

In S1301, the image processing apparatus 1200 sets the representative wavelength for each color channel to a preset initial value, and calculates the polarization angle $\varphi(\lambda)$ for each color channel for each input image. The initial value does not have to be a single value, and the image processing apparatus 1200 may automatically select it from among a plurality of initial values, or the user may manually select the initial value. The image processing apparatus 1200 automatically selects it using correction information calculated by the conventional white balance correction on the input image that is captured in the state where the phase difference (retardation) given by the variable retardation plate is the least among the plurality of input images.

Next, in S1302, the image processing apparatus 1200 acquires the polarization information A, B, $\theta$ for each color channel in each pixel using the polarization angle $\varphi(\lambda)$ calculated in S1301, each input image, and the expression (6).

Next, in S1303, the image processing apparatus 1200 compares the phase components $\theta$ calculated for each color channel with each other, and determines whether or not the difference between them is equal to or less than a predetermined threshold. At this time, it sets one of the plurality of color channels to a reference, and evaluates the difference from the reference color channel. The threshold may be 20° or less, 10° or less, or 5° or less.

When the difference in the angle component $\theta$ is larger than the threshold, the image processing apparatus 1200 returns to S1301, resets the representative wavelength, and repeats the subsequent processing. Thereby, the representative wavelength is sequentially changed from the initial value. If the difference in the angle component $\theta$ is equal to or less than the threshold value, the flow proceeds to S1304, and generates a combined image different from the input image using A, B, and $\theta$ acquired in S1302.

In S1303, even if the difference is equal to or less than the threshold, if the number of repetitions of S1301 to S1303 is less than the specified number of times, the representative wavelength may be reset and the processing may be repeated. In this case, the image processing apparatus 1200 may reset the representative wavelength and repeats the processing until the number of repetitions of S1301 to S1303 reaches the predetermined number, sets the representative wavelength that minimizes the difference to the final representative wavelength, and generates a combined image using the polarization information at the representative wavelength. S1301 to S1303 may be repeated until the number of repetitions reaches the specified number of times without setting the threshold, and the combined image may be created with the polarization information at the representative wavelength where the difference is minimized.

Comparative Example

Figure 18:
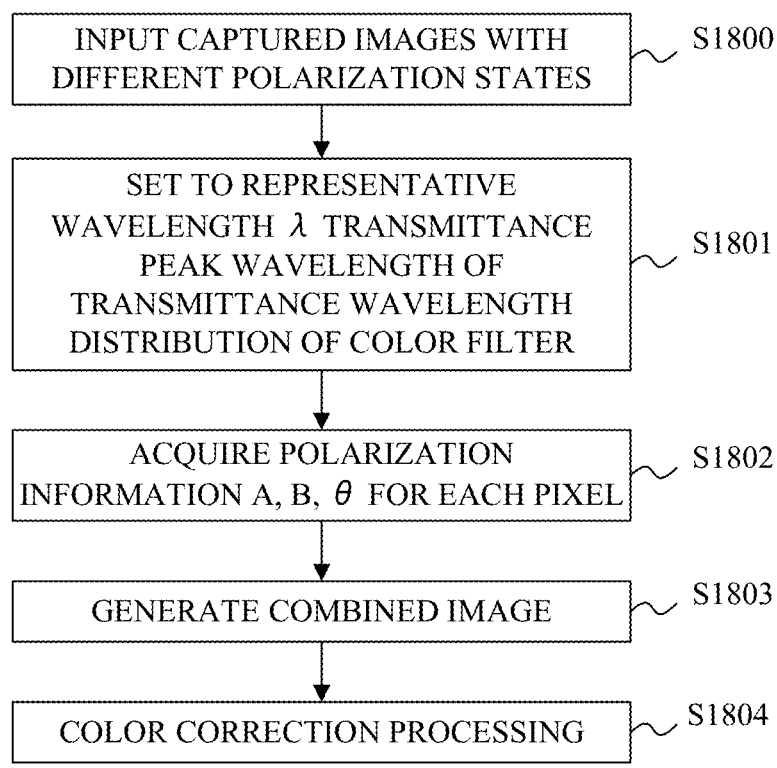
FIG. 18 is a flowchart showing image processing according to a comparative example.

Referring now to a flowchart in FIG. 18, a description will be given of a conventional image processing apparatus according to a comparative example of the fourth embodiment, which sets, to a representative wavelength, a transmittance peak wavelength of the transmittance distribution of the color filter in the image sensor.

In S1800, the conventional image processing apparatus shown in JP 2017-191989, similar to the image processing apparatus 1200 of the fourth embodiment, acquires a plurality of input images having different polarization states generated by an image pickup apparatus that includes a polarizing element having a variable retardation plate and a polarizing plate, and an image sensor configured to acquire a colored image.

In S1801, the image processing apparatus sets the transmittance peak wavelength of the color filter for each color corresponding to each color channel to the representative wavelength for each color channel. S1802 and S1803 are the same as S1302 and S1304 in the fourth embodiment.

This comparative example does not execute the processing of determining the difference in the phase component $\theta$ for each color channel, which is performed in S1303 in the fourth embodiment. If the representative wavelength set in S1801 is improper, the combined image created in S1803 will be unnaturally colored. Thus, in S1804, the image processing apparatus performs color correction processing so that the reference image and the combined image have the same color information in order to eliminate coloring of the combined image created in S1803. Here, the reference image is set to one of input images which has the least phase difference (retardation) given by the variable retardation plate during imaging. When the reference image selected in S1804 has a colored area different from the color of the object due to the influence of shading, gloss, etc., the color correction processing in S1804 cannot correctly correct coloring of the combined image.

Fifth Embodiment

Figure 14:
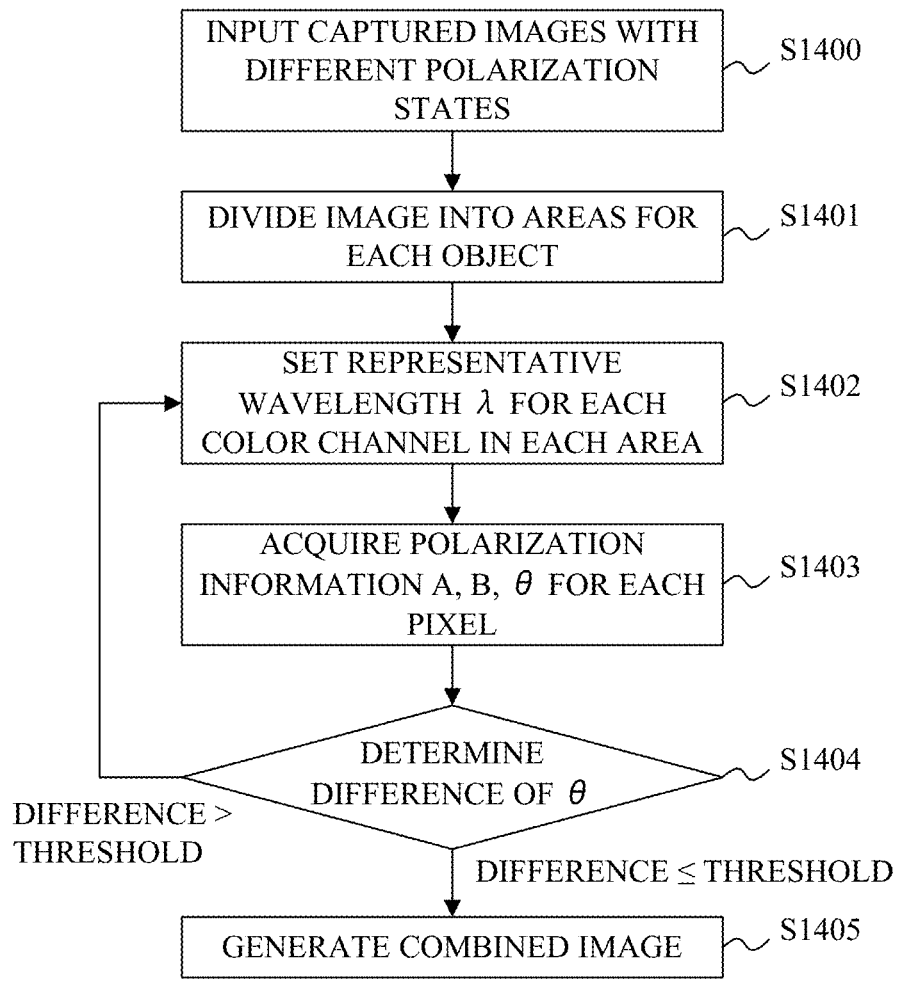
FIG. 14 is a flowchart showing image processing according to the fifth embodiment.

A flowchart in FIG. 14 shows image processing executed by an image processing apparatus 1200 according to a fifth embodiment of the disclosure. In this embodiment, a plurality of captured images acquired in S1400 similar to S1300 of the fourth embodiment are divided into areas (blocks) in S1401.

Then, the image processing apparatus 1200 sets an initial value of a representative wavelength in S1402 for each divided area corresponding to each other in the plurality of captured images, similar to S1301 of the fourth embodiment, and acquires the polarization information in S1403 similar to S1302 of the fourth embodiment. In S1404, the difference in the phase component $\theta$ is determined in the same manner as S1303 of the fourth embodiment, the final representative wavelength is determined, and the combined image is created in S1405. The representative wavelength for each color channel may be the same for all the divided areas.

Sixth Embodiment

Figure 15:
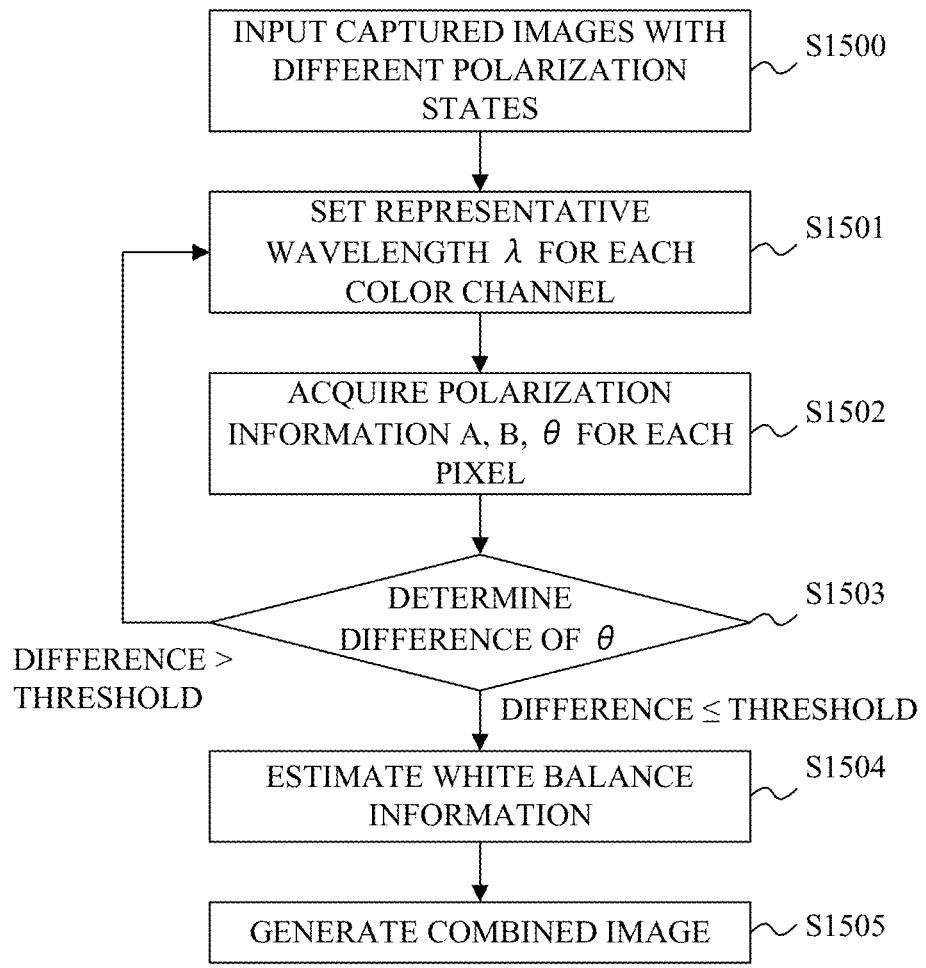
FIG. 15 is a flowchart showing image processing according to the sixth embodiment.

A flowchart in FIG. 15 shows image processing executed by an image processing apparatus 1200 according to a sixth embodiment of the disclosure. In FIG. 15, S1500 to S1503 and S1505 are the same as S1300 to S1304 of the fourth embodiment (FIG. 13).

In this embodiment, in S1504 before the combined image is generated in S1505, the image processing apparatus 1200 detects an area estimated to be white using the finally determined representative wavelength, and calculates a white balance correction coefficient. In S1505, the image processing apparatus 1200 creates a combined image and performs the white balance correction for the combined image using the white balance correction coefficient.

The image may be divided into areas (blocks) between S1500 and S1501 similar to S1401 of the fifth embodiment. At this time, when the captured image is divided into a plurality of blocks in calculating the white balance correction coefficient, the area division of the image performed in advance may be shared.

Seventh Embodiment

Figure 17:
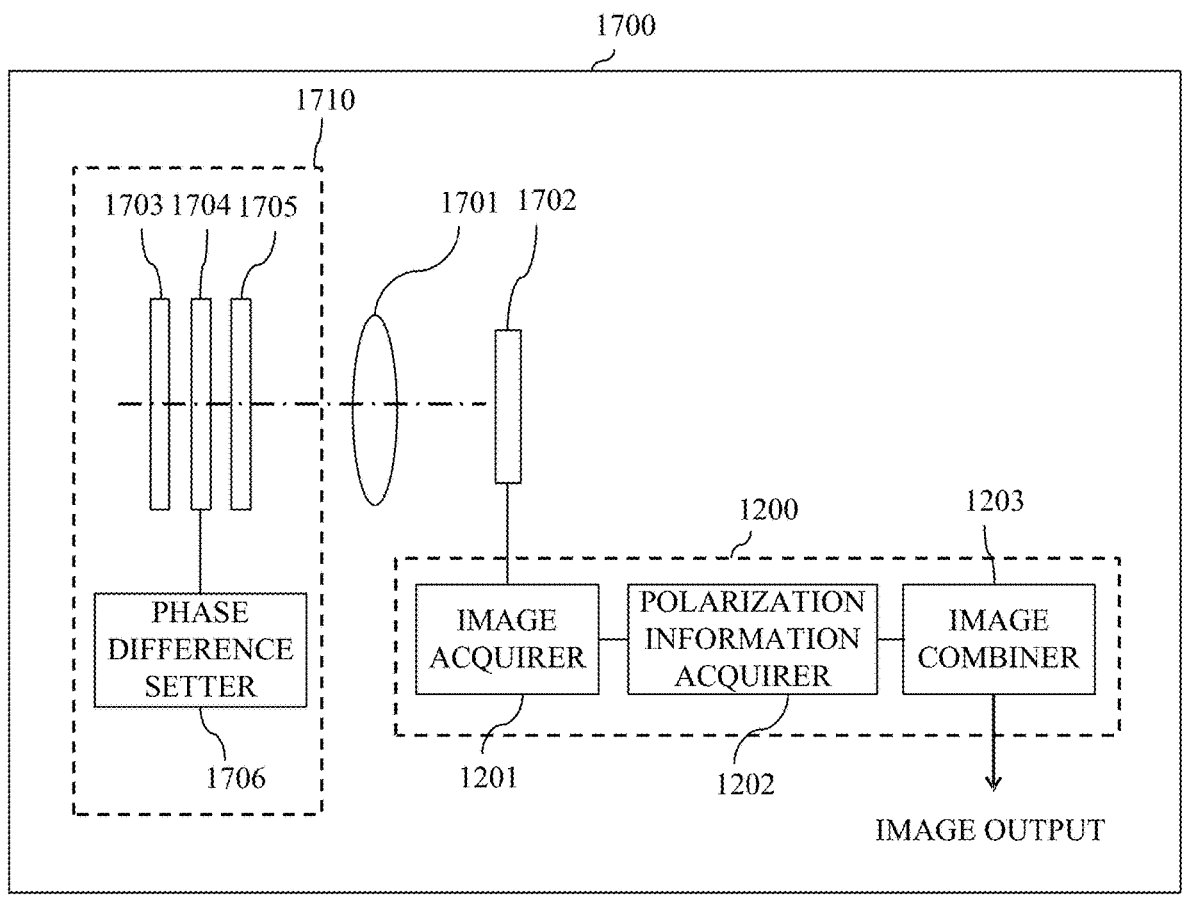
FIG. 17 illustrates an image pickup apparatus that includes the image processing apparatus according to one of the fourth to sixth embodiments.

FIG. 17 shows a configuration of an image pickup apparatus 1700 that includes the image processing apparatus 1200 according to one of the first to third embodiments. The image pickup apparatus 1700 includes an imaging lens 1701 that images light from an object, and an image sensor 1702 such as a CCD sensor or a CMOS sensor that captures (photoelectrically converts) an object image formed by the imaging lens 1701. A polarization acquirer 1710 is disposed on the object side of the imaging lens 1701. The polarization acquirer 1710 may be disposed between the imaging lens 1701 and the image sensor 1702.

The polarization acquirer 1710 includes a waveplate (quarter waveplate) 1703, a variable retardation plate 1704, and a polarizing plate 1705. The quarter waveplate 1703 provides a relative phase difference (retardation) of $\pi/2$ between the orthogonal polarization components of the incident light. This embodiment uses the quarter waveplate for the retardation plate but may use three-quarter waveplate or the like as long as the relative phase difference of $\pi/2$ can be imparted.

Similar to the quarter waveplate 1703, the variable retardation plate 1704 can give a relative phase difference between the orthogonal polarization components of the incident light, and can further change the given relative phase difference. The variable retardation plate 1704 can use one that can change the phase difference using a liquid crystal. The phase difference of the variable retardation plate 1704 is variably set according to the voltage applied from a phase difference setter 1706. The polarizing plate 1705 transmits a component in the transmission axis direction (transmission polarization direction) among the polarization components of the incident light.

The polarization acquirer 1710 can change the polarization angle of the light that has transmitted through the polarization acquirer 1710, by changing the phase difference given by the variable retardation plate 1704. Thus, by imaging a plurality of times by changing the phase difference given by the variable retardation plate 1704 in capturing the image, the image pickup apparatus 1700 can generate a plurality of images by capturing a plurality of polarized light beams having different polarization states.

The image pickup apparatus 1700 has the image processing apparatus 1200 shown in FIG. 1 that acquires a plurality of captured images generated with the imaging signals from the image sensor 1702. As described in the fourth to sixth embodiments, the image processing apparatus 1200 acquires the polarization information from the acquired plurality of captured images, and uses them to generate and output (record or display) a combined image.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

When an output image different from the input image is generated, the above embodiments can reduce coloring of the output image.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-116306, filed on Jul. 6, 2020 and 2020-160360, filed on Sep. 25, 2020 which are hereby incorporated by reference herein in their entirety.

What is claimed is:

1. An apparatus comprising a memory storing instructions, and at least one processor that, executes the instructions to:
    acquire a plurality of input images obtained via image capturing using light with a plurality of different polarization states;
    angle information on each of first pixels corresponding to a first wavelength in each of the input images based on a first luminance value of each of the first pixels;
    acquire second angle information on each of second pixels corresponding to a second wavelength in a specific area in each of the input images based on a second luminance value of each of the second pixels;
    acquire corrected polarization information obtained by replacing the first angle information on at least one pixel in the specific area among the first pixels with the second angle information; and
    generate an output image using the corrected polarization information, wherein the first angle information represents a first polarization angle that maximizes the first luminance value, and wherein the second angle information represents a second polarization angle that maximizes the second luminance value.

2. The apparatus according to claim 1, wherein the at least one processor executes the instructions to acquire third angle information on each of third pixels corresponding to a third wavelength in each of the input images based on a luminance value of each of the third pixels, and wherein the corrected polarization information obtained by replacing the third angle information on at least one pixel in the specific area among the third pixels with the second angle information.

3. The apparatus according to claim 1, wherein the first wavelength and the second wavelength are wavelengths corresponding to any two of R, G and B.

4. The apparatus according to claim 2, wherein the first wavelength, the second wavelength and the third wavelength are wavelengths respectively corresponding to any of R, G and B.

5. The apparatus according to claim 1, wherein the at least one processor executes the instructions to selects, as the specific area, an area in each of the input images in which a degree of polarization is larger than a predetermined value.

6. The apparatus according to claim 1, wherein the at least one processor executes the instructions to selects, as the specific area, an area in which a difference in the first polarization angle and second polarization angle is larger than a predetermined value.

7. The apparatus according to claim 1, wherein the at least one processor executes the instructions to divides each of the input images into a plurality of areas based on wavelength information, and to selects the specific area from the plurality of areas.

8. The apparatus according to claim 1, wherein the at least one processor executes the instructions to selects the second wavelength according to polarization information or wavelength information in the specific area.

9. An image pickup apparatus comprising:
the apparatus according to claim 1; and
a sensor configured to acquire input images.

10. The image pickup apparatus according to claim 9, further comprising a polarizing element configured to control a polarization state of transmitting light.

11. The image pickup apparatus according to claim 10, wherein the polarizing element includes a variable retardation plate made of liquid crystal, and a polarizing plate.

* * * * *